US009965642B2

(12) United States Patent
Badam et al.

(10) Patent No.: US 9,965,642 B2
(45) Date of Patent: May 8, 2018

(54) POWER EFFICIENT STORAGE MANAGEMENT

(71) Applicant: Microsoft Technology Licensing, LLC, Redmond, WA (US)

(72) Inventors: Anirudh Badam, Redmond, WA (US); Ranveer Chandra, Bellevue, WA (US); Qi Zhang, Redmond, WA (US); Bruce Lee Worthington, Redmond, WA (US); Jing Li, La Jolla, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/420,983

(22) Filed: Jan. 31, 2017

(65) Prior Publication Data

US 2017/0169243 A1    Jun. 15, 2017

Related U.S. Application Data

(62) Division of application No. 14/672,582, filed on Mar. 30, 2015, now Pat. No. 9,596,235.

(51) Int. Cl.
*H04L 29/06* (2006.01)
*G06F 21/62* (2013.01)
(Continued)

(52) U.S. Cl.
CPC ........ *G06F 21/6218* (2013.01); *G06F 1/3287* (2013.01); *G06F 3/065* (2013.01);
(Continued)

(58) Field of Classification Search
CPC . H04L 63/0853; G06F 21/6218; G06F 21/602
See application file for complete search history.

(56) References Cited

U.S. PATENT DOCUMENTS 7,149,896 B1 *  12/2006  Bahl ................... H04L 63/0428
                                                              380/270
8,464,073 B2     6/2013  Salessi
(Continued)

FOREIGN PATENT DOCUMENTS

CN           103324516 A      9/2013

OTHER PUBLICATIONS

Miettinen, et al., "Energy Efficiency of Mobile Clients in Cloud Computing", In Proceedings of the 2nd USENIX Conference on Hot Topics in Cloud Computing, Jun. 22, 2010, 7 pages.
(Continued)

*Primary Examiner* — Mohammed Waliullah
(74) *Attorney, Agent, or Firm* — International IP Law Group, PLLC

(57) ABSTRACT

One or more systems and/or techniques are provided for managing a partially encrypted file system, for storage hardware virtualization, and/or for storage management. In example, data may be stored in a partially encrypted file system, where sensitive data is encrypted for security and non-sensitive data is unencrypted, which may mitigate energy usage otherwise used for encrypting non-sensitive data, thus improving battery life. In an example, a storage device may be exposed to applications as a plurality of isolated storage structures where an application is provided data access to an isolated storage structure assigned to the application but not to isolated storage structures assigned to other applications, which may provide hardware level isolation with improved energy efficiency. In an example, a storage management component, configured to provide isolation and encryption, may be integrated into a computing device as an application specific integrated circuit (ASIC) or a system on a chip (SoC).

20 Claims, 9 Drawing Sheets

(51) Int. Cl.
G06F 1/32 (2006.01)
G06F 3/06 (2006.01)
G06F 9/54 (2006.01)
G06F 12/14 (2006.01)

(52) U.S. Cl.
CPC ............ *G06F 3/068* (2013.01); *G06F 3/0613* (2013.01); *G06F 3/0625* (2013.01); *G06F 9/54* (2013.01); *G06F 12/1408* (2013.01); G06F 2212/1052 (2013.01)

(56) References Cited

U.S. PATENT DOCUMENTS

| | | | |
|---|---|---|---|
| 2004/0193364 A1* | 9/2004 | Chojnacki | G01C 21/32 726/30 |
| 2011/0044452 A1 | 2/2011 | Hiriart | |
| 2013/0046740 A1* | 2/2013 | Li | G06F 17/30165 707/695 |
| 2014/0006798 A1* | 1/2014 | Prakash | G06F 21/6218 713/189 |
| 2014/0029340 A1 | 1/2014 | Wang | |
| 2015/0200921 A1* | 7/2015 | Linga | G06F 21/44 713/171 |
| 2016/0011990 A1 | 1/2016 | Berengoltz et al. | |
| 2016/0294818 A1 | 10/2016 | Badam et al. | |
| 2017/0046071 A1* | 2/2017 | Best | G06F 3/0613 |

OTHER PUBLICATIONS

"Profiling with Traceview and Dmtracedump", Retrieved on: Jun. 24, 2014 Available at: http://developer.android.com/tools/debugging/debugging-tracing.html, 5 pages.
"Analyzing Display and Performance", Retrieved on: Jun. 24, 2014 Available at: http://developer.android.com/tools/debugging/systrace.html, 5 pages.
"Storage Options", Retrieved on: Jun. 24, 2014 Available at: http://developer.android.com/guide/topics/data/data-storage.html, 7 pages.
Balasubramanian, et al., "Energy Consumption in Mobile Phones: A Measurement Study and Implications for Network Applications", In Proceedings of the 9th ACM SIGCOMM Conference on Internet Measurement Conference, Nov. 4, 2009, 14 pages.
Bickford, et al., "Security versus Energy Tradeoffs in Host-Based Mobile Malware Detection", In Proceedings of the 9th International Conference on Mobile Systems, Applications, and Services, Jun. 28, 2011, 14 pages.
"BitLocker Drive Encryption", Retrieved on: Jun. 24, 2014 Available at: http://windows.microsoft.com/en-us/windows7/products/features/bitlocker, 1 page.
Carroll, et al., "An Analysis of Power Consumption in a Smartphone", In Proceedings of the USENIX Conference on USENIX Annual Technical Conference, Jun. 23, 2010, 14 pages.
Caufield, et al., "Providing Safe, User Space Access to Fast, Solid State Disks", In Proceedings of the Seventeenth International Conference on Architectural Support for Programming Languages and Operating Systems, Mar. 3, 2012, 13 pages.
Chen, et al., "Understanding Intrinsic Characteristics and System Implications of Flash Memory Based Solid State Drives", In Proceedings of the Eleventh International Joint Conference on Measurement and Modeling of Computer Systems, Jun. 15, 2009, 12 pages.
Choudhuri, et al., "Energy Characterization of Filesystems for Diskless Embedded Systems", In Proceedings of the 41st Annual Design Automation Conference, Jun. 7, 2004, pp. 566-569.
Condit, et al., "Better I/0 Through Byte-Addressable, Persistent Memory", In Proceedings of the ACM SIGOPS 22nd Symposium on Operating Systems Principles, Oct. 11, 2009, 14 pages.
Dong, et al., "Self-Constructive High-Rate System Energy Modeling for Battery-Powered Mobile Systems", In Proceedings of the 9th International Conference on Mobile systems, Applications, and Services, Jun. 28, 2011, 14 pages.
Enck, et al., "Taintoroid: An Information-Flow Tracking System for Realtime Privacy MOnitoring on Smartphones", In Proceedings of the 9th USENIX Conference on Operating Systems Design and Implementation, Oct. 4, 2010, 15 pages.
Bragg, Roberta, "The Encrypting File System", Retrieved on: Jun. 24, 2014 Available at: http://technet.microsofl.com/enus/library/cc700811.aspx, 9 pages.
Flinn, et al., "Energy-Aware Adaptation for Mobile Applications", In Proceedings of 17th ACM Symposium on Operating Systems Principles, Dec. 1999, pp. 48-63.
Fonseca, et al., "Quanta: Tracking Energy in Networked Embedded Systems", In Proceedings of the 8th USENIX Conference on Operating Systems Design and Implementation, Dec. 8, 2008, 16 pages.
Geambasu, et al., "Keypad: An Auditing File System for Theft-Prone Devices", In Proceedings of the Sixth Conference on Computer Systems, Apr. 10, 2011, 15 pages.
"The GNU Privacy Guard", Retrieved on: Jun. 24, 2014 Available at: http://www.gnupg.org/, 2 pages.
"Java Native Interface", Retrieved on: Jun. 24, 2014 Available at: http://developer.android.com/training/articles/perf-jni.html, 10 pages.
Kim, et al., "Revisiting Storage on Smartphones" In Journal of ACM Transactions on Storage, vol. 8, Issue 4, Nov. 2012, 14 pages.
Mittal, et al., "Empowering Developers to Estimate App Energy Consumption", In Proceedings of the 18th Annual International Conference on Mobile Computing and Networking, Aug. 22, 2012, 11 pages.
"Power Monitor", Retrieved on: Jun. 24, 2014 Available at: http://www.msoon.com/LabEquipment/PowerMonitod, 1 page.
"NI 9206 Measurement System", Retrieved on: Jun. 24, 2014 Available at: http://sine.ni.com/nips/cds/view/p/lang/en/nid/209870, 2 pages.
Pathak, et al., "Fine-Grained Power Modeling for Smartphones using System Call Tracing", In Proceedings of the Sixth Conference on Computer Systems, Apr. 10, 2011, 15 pages.
Pathak, et al., "Where is the Energy Spent Inside My App?: Fine Grained Energy Accounting on Smartphones", In Proceedings of the 7th ACM European Conference on Computer Systems, Apr. 10, 2012, 14 pages.
Pinheiro, et al., "Energy Conservation Techniques for Disk Array-Based Servers", In Proceedings of the 18th Annual International Conference on Supercomputing, Jun. 26, 2004, 11 pages.
Qian, et al., "Profiling Resource Usage for Mobile Applications: A Cross-layer Approach", In Proceedings of the 9th International Conference on Mobile Systems, Applications, and Services, Jun. 28, 2011, 14 pages.
Roy, et al., "Energy Management in Mobile Devices with the Cinder Operating System", In Proceedings of the Sixth European Conference on Computer Systems, Apr. 2011, pp. 1-15.
"Latest Simplified Specifications", Retrieved on: Jun. 24, 2014 Available at: https://www.sdcard.org/downloads/pls/simplified_specs/, 1 page.
Sengal, et al., "Evaluating Performance and Energy in File System Server Workloads", In Proceedings of the 8th USENIX Conference on File and Storage Technologies, Feb. 23, 2010, 14 pages.
Shye, et al., "Into the wild: Studying real user activity patterns to guide power optimizations for mobile architectures", In Proceedings of the 42nd Annual IEEE/ACM International Symposium on Microarchitecture, Dec. 12, 2009, 11 pages.
Storer.et al., "Pergamum: Replacing Tape with Energy Efficient, Reliable, Disk-Based Archival Storage", Retrieved on : Jun. 24, 2014, Available at: https://www.usenix.org/legacy/evenl/fasto8/tech/fu11_papers/storer/storer_html/, 18 pages.
Thiagarajan, et al., "Who Killed My Battery: Analyzing Mobile Browser Energy Consumption", In Proceedings of the 21st international conference on World Wide Web, Apr. 16, 2012, 10 pages.
Wang, et al., "A Framework for Energy Efficient Mobile Sensing for Automatic Human State Recognition", In Proceedings of the 7th international conference on Mobile systems, applications, and services, Jun. 22, 2009, 14 pages.

(56) References Cited

OTHER PUBLICATIONS

"Windows Performance Toolkit", Published on : Jun. 24, 2014, Available at: http://msdn.microsoft.com/en-US/#fbid=vFqOcgpNZk4, 2 pages.
"Quickstart: Reading and writing files (XAML)\", Retrieved on: Jun. 24, 2014, Available at: http://msdn.microsoft.com/en-us/library/windows/apps/xaml/hh758325.aspx, 5 pages.
Wu, et al., "SCMFS: A File System for Storage Class Memory", In Proceedings of 2011 International Conference for High Performance Computing, Networking, Storage and Analysis, Article No. 39, Nov. 12, 2011, 11 pages.
Yoon, et al., "AppScope: Application Energy Metering Framework for Android Smartphones using Kernel Activity Monitoring", In Proceedings of the USENIX conference on Annual Technical Conference, Jun. 13, 2012, 14 pages.
Zeldovich, et al., "Making Information Flow Explicit in HiStar", In Proceedings of the 7th USENIX Symposium on Operating Systems Design and Implementation, vol. 7, Nov. 6, 2006, 16 pages.
Zhang, et al., "Accurate online power estimation and automatic battery behavior based power model generation for smartphones", In Proceedings of the eighth IEEE/ACM/IFIP international conference on Hardware/software codesign and system synthesis, Oct. 24, 2010, 10 pages.
Verity, John W., "Non-Volatile DRAM Is Poised to Give Apps a Big Boost", Published on: Sep. 19, 2012, Available at: http://www.datacenteracceleration.com/author.asp?section_id=2412&doc_id=251009, 4 pages.
"Martin: Future nonvolatile memory technologies", Published on: Jan. 13, 2014, Available at: http://searchsolidstatestorage.techtarget.com/video/Martin-Future-nonvolatile-memory-technologies. 10 pages.
Krishna, et al., "Privacy-Preserving Data Management in Mobile Environments: A Partial Encryption Approach", In IEEE 13th International Conference on Mobile Data Management, Jul. 23, 2012, 9 pages.
Luo, et al., "qNVRAM: quasi Non-Volatile RAM for Low Overhead Persistency Enforcement in Smartphones", In 6th USENIX Workshop on Hot Topics in Storage and File Systems, Jun. 17, 2014, 5 pages.
Servetii, et al., "Perception-Based Partial Encryption of Compressed Speech", In IEEE Transactions on Speech and Audio Processing, vol. 10, Issue 8, Nov. 11, 2002, 7 pages.
Khashan, et al., "An Efficient Adaptive of Transparent Spatial Digital Image Encryption", In the 4th International Conference on Electrical Engineering and Informatics, Jun. 25, 2013, 10 pages.
Lee, et al., "Unioning of the Buffer Cache and Journaling Layers with Non-volatile Memory", In Proceedings of 11th USENIX Conference on File and Storage Technologies, Feb. 12, 2013, 8 pages.
Nightingale, et al., "Energy-Efficiency and Storage Flexibility in the Blue File System", In Proceedings of 6th Symposium on Operating Systems Design and Implementation, vol. 6, Dec. 6, 2004, 16 pages.

* cited by examiner

US 9,965,642 B2

POWER EFFICIENT STORAGE MANAGEMENT

CROSS-REFERENCE TO RELATED APPLICATIONS

This application is a divisional of U.S. patent application Ser. No. 14/672,582, filed Mar. 30, 2015, and titled "POWER EFFICIENT STORAGE MANAGEMENT," the application of which is incorporated herein in its entirety by reference.

BACKGROUND

Many computing devices, such as desktops, laptops, smart phones, and tablets, are developed around conserving power consumption and/or extending battery life. In an example, a mobile device may be transitioned into a connected standby state. While in the connected standby state, a screen of the mobile device is powered off along with low priority functionality (e.g., a videogame, a calculator app, and a camera app may be placed in a sleep state). Other higher priority functionality may remain operable (e.g., an incoming message notification service may be placed in a low power operational state in order to detect incoming messages so that the mobile device may awaken into an up-to-date state with regard to new messages and/or other data).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for managing a partially encrypted file system, for storage hardware virtualization, and/or for storage management are provided herein. In an example of managing a partially encrypted file system, data that is to be stored by an application to a partially encrypted file system may be identified. A data sensitivity for the data may be determined. Responsive to the data sensitivity exceeding an encryption threshold, the data may be stored as encrypted data within the partially encrypted file system. Responsive to the data sensitivity not exceeding the encryption threshold, the data may be stored as unencrypted data within the partially encrypted file system.

In an example of storage hardware virtualization, a storage virtualization component is configured to identify a first application that is to be hosted by a computing device. The storage virtualization component is configured to identify a second application that is to be hosted by the computing device. The storage virtualization component is configured to expose a first portion of a storage device to the first application as a first isolated storage structure for data storage by the first application based upon a first energy constraint for the first application. The storage virtualization component is configured to expose a second portion of the storage device to the second application as a second isolated storage structure for data storage by the second application based upon a second energy constraint for the second application.

In an example of storage management, a storage management component comprises an isolation component. The isolation component is configured to provide a first application hosted on a computing device with access to a first portion of a storage device but not a second portion of the storage device. The isolation component is configured to provide a second application hosted on the computing device with access to the second portion of the storage device but not the first portion of the storage device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
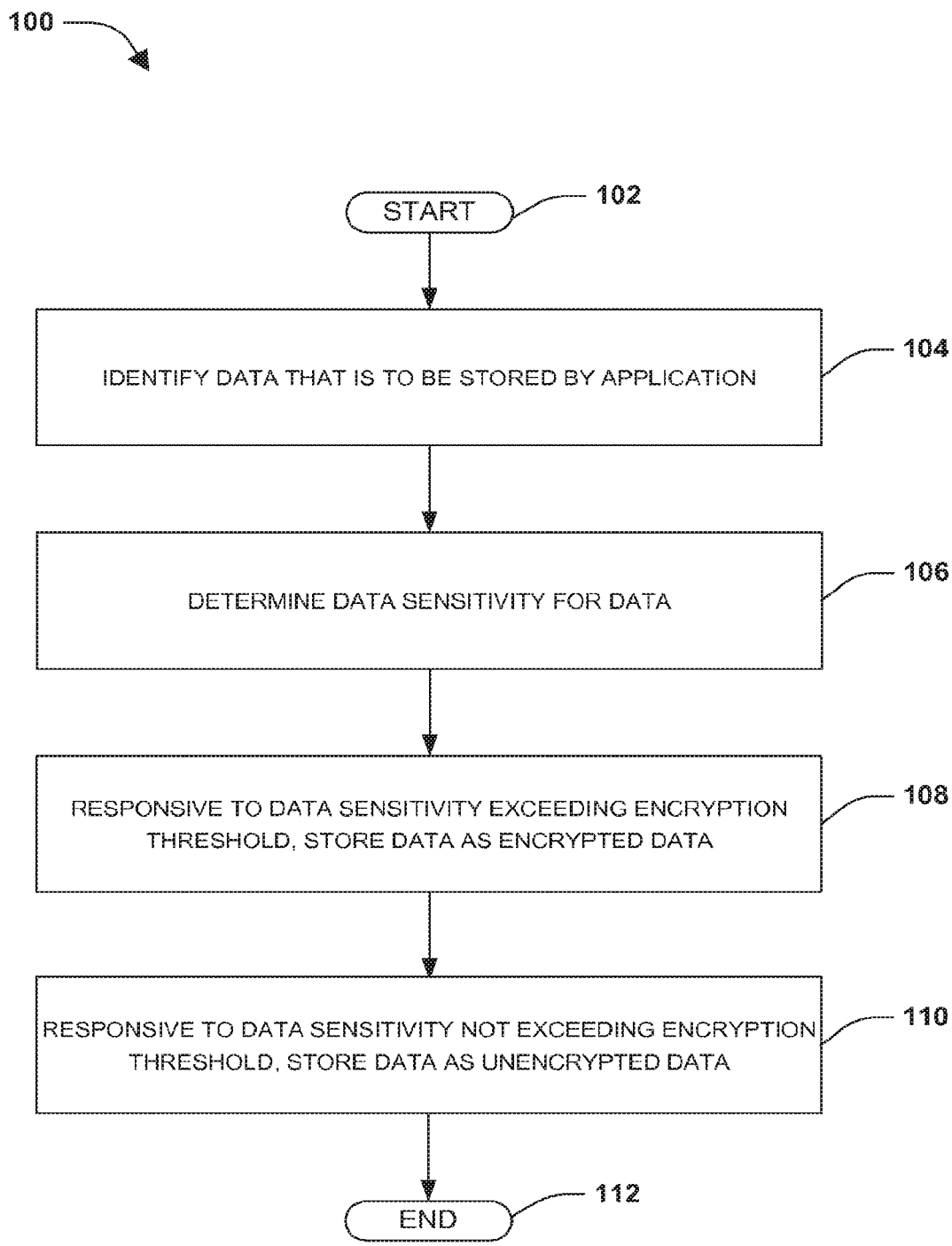
FIG. 1 is a flow diagram illustrating an exemplary method of managing a partially encrypted file system.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for managing a partially encrypted file system, for storage hardware virtualization, and/or for storage management are provided herein. Many users may prefer computing devices, such as a mobile device (e.g., a smart phone, a tablet, etc.), with relatively long lasting battery life. Some computing devices may provide a low power state to conserve power consumption and improve battery life. While in the low power state, a computing device may allow certain applications and/or functionality to execute (e.g., messaging functionality may be allowed to check for new incoming messages so that new messages may be available when the computing device is brought back into a normal operating state). Unfortunately, storage functionality, performed while in the low power state and/or during the normal operating state, may consume a relatively large amount of energy because of encryption used for security and/or because of overhead resulting from applications that execute in a managed programming language environment that provides application isolation between applications. For example, an encryption hardware subsystem may be unable to match the throughput of a storage device, such as a nonvolatile memory card, and thus encryption may be performed on a general central processing unit (CPU) that may increase energy usage used to perform encryption. The management of applications executing in the managed programming language environment (e.g., executing by a common language runtime (CLR)) may result in additional computational overhead and thus energy usage.

As provided herein, a partially encrypted file system may be used to store sensitive data as encrypted data and to storage non-sensitive data as unencrypted data, which may mitigate energy utilization that may otherwise occur should both sensitive data and non-sensitive data be encrypted. Thus, sensitive data (e.g., locational data of a user, social network data of the user, etc.) may remain secure while improving energy efficiency of the computing device by not using computational resources to encrypt non-sensitive data. As provided herein, storage hardware virtualization may be used to expose a single storage device, such as the nonvolatile memory card, as a plurality of isolated storage structures to applications in order to provide data isolation between applications, which may mitigate energy utilization by eliminating or reducing reliance on a CLR for managing the applications (e.g., where the CLR may be computationally intensive and thus consume significant resources, energy, etc.). As provided herein, a storage management component may comprise an isolation component that may provide isolation between applications at a hardware level and/or an encryption component to provide hardware encryption that may match the throughput of a storage device, which may mitigate energy utilization by eliminating or reducing reliance on a CLR for isolation and/or a general CPU for encryption.

An embodiment of managing a partially encrypted file system is illustrated by an exemplary method 100 of FIG. 1. At 102, the method starts. A computing device, such as a mobile device (e.g., a smart phone, a tablet, etc.), may host one or more applications such as a first application and a second application. The one or more applications may be allowed to perform certain functionality while the computing device is in a low power state, such as a connected standby state or a display off state. Such functionality may involve storing data to a file system of the mobile device. As provided herein, a partially encrypted file system may be managed for the computing device so that data may be stored for applications as encrypted data or unencrypted data while the computing device is in a normal operational state and/or while the computing device is in the low power state, which may mitigate energy utilization that may otherwise occur should all data be encrypted.

At 104, data that is to be stored by the first application to the partially encrypted file system may be identified (e.g., a social network application may be storing physical user location data within a social network file). At 106, a data sensitivity for the data may be determined. For example, a data sensitivity specification associated with the first application (e.g., an application manifest specified by an app developer; a policy enforced by a platform such as an enterprise platform for an enterprise social network; etc.) may be evaluated to determine the data sensitivity (e.g., a value on a scale from least sensitive to most sensitive; a designation as either sensitive or non-sensitive; etc.) for the data.

At 108, responsive to the data sensitivity exceeding an encryption threshold (e.g., the data sensitivity may indicate that the physical user location data is sensitive, and thus the data sensitivity may exceed the encryption threshold), the data may be stored as encrypted data within the partially encrypted file system. At 110, responsive to the data sensitivity not exceeding the encryption threshold (e.g., the data sensitivity may indicate that the physical user location data is not sensitive, and thus the data sensitivity may not exceed the encryption threshold), the data may be stored as unencrypted data within the partially encrypted file system. In an example, the data may be stored while the computing device is in the normal operation state. In an example, the data may be stored while the computing device is in the low power state (e.g., the connected standby state or the display off state).

In an example, second data, corresponding to a second portion of the social network file may be identified (e.g., the social network application may be storing an application binary update within the social network file). The data sensitivity specification may be evaluated to determine a second data sensitivity for the second data. Responsive to the second data sensitivity exceeding the encryption threshold (e.g., the second data sensitivity may indicate that the application binary update is sensitive, and thus the second data sensitivity may exceed the encryption threshold), the second data may be stored as encrypted second data within the partially encrypted file system. Responsive to the second data sensitivity not exceeding the encryption threshold (e.g., the second data sensitivity may indicate that the application binary update is not sensitive, and thus the second data sensitivity may not exceed the encryption threshold), the second data may be stored as unencrypted second data within the partially encrypted file system. In an example, the physical user location data of the social network file may be stored as the encrypted data and the application binary update of the social network file may be stored as the unencrypted second data, and thus one portion of a file may be stored as encrypted data while another portion of the file may be stored as unencrypted data. In an example, a portion of data of a second application may be stored as encrypted data within the partially encrypted file system while another portion of the data of the second application may be stored as unencrypted data within the partially encrypted file system (e.g., a contact list of an email application may be encrypted while email application binaries of the email application may be unencrypted). Accordingly, certain portions of data for different applications may be stored as encrypted data while other portions of the data for the different applications may be stored as unencrypted data.

In an example, a request for encrypted data may be received from a requestor (e.g., the social network application may request encrypted user contact data stored on the partially encrypted file system). The requestor may have permission to access the encrypted data. An unencrypted version of the encrypted data may be provided to the requestor. The unencrypted version of the encrypted data may be actively tracked to enforce a safety policy specifying that no copies of the unencrypted version of the encrypted data are to remain on persistent storage after use by the requestor. For example, the unencrypted version of the encrypted data may be deleted or may be encrypted again for storage within the partially encrypted file system after the social network application is finished with the unencrypted version of the encrypted data. In an example, the safety policy may specify that the unencrypted version of the encrypted data is to be stored within DRAM memory and not within other types of memory. In this way, energy utilized during data encryption may be mitigated by merely encrypting sensitive data, and security may be preserved by enforcing the safety policy. At 112, the method ends.

Figure 2A:
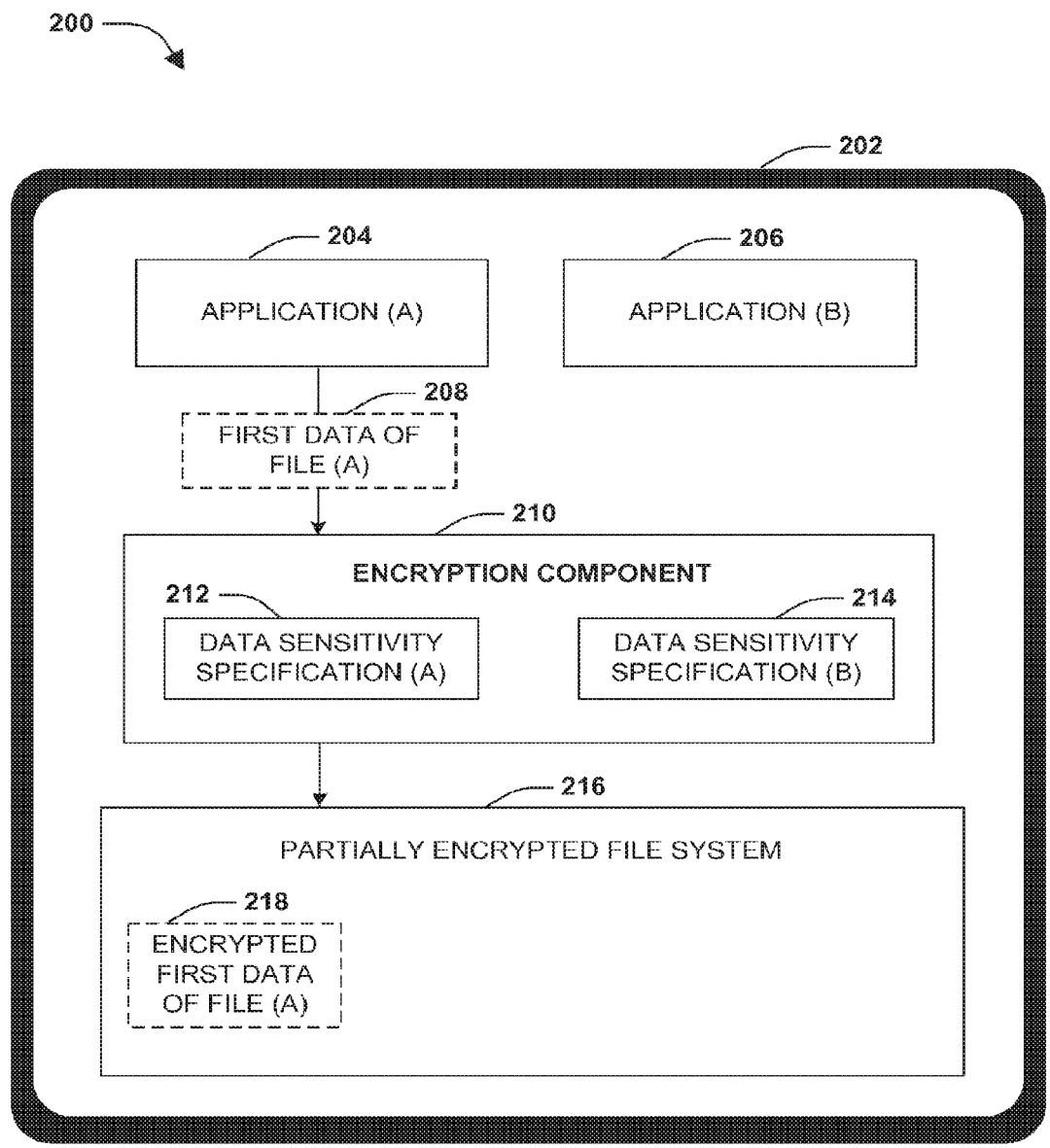
FIG. 2A is a component block diagram illustrating an exemplary system for managing a partially encrypted file system, where first data is stored as encrypted data within the partially encrypted file system.

FIGS. 2A-2D illustrate examples of a system 200, comprising an encryption component 210, for managing a partially encrypted file system 216. FIG. 2A illustrates the encryption component 210 being associated with a computing device 202 that hosts the partially encrypted file system 216. An application (A) 204, an application (B) 206, and/or other applications of the computing device 202 may store data, through the encryption component 210, within the partially encrypted file system 216. A data sensitivity specification (A) 212 (e.g., an application manifest, a platform policy, etc.) may specify whether the application (A) 204 and/or data of the application (A) 204 is sensitive (e.g., user data such as location of the user, a user contacts list, financial information, business information, etc.) or non-sensitive (e.g., application binary, a videogame app file, API data, etc.).

The encryption component 210 may identify first data 208 of a file (A) that is to be stored by the application (A) 204. In an example where the application (A) 204 comprises a racing videogame, the first data 208 of file (A) may correspond to a user purchase validation code stored within a racing game file of the racing videogame. The encryption component 210 may evaluate the data sensitivity specification (A) 212 to determine a data sensitivity for the user purchase validation code. For example, the data sensitivity may indicate that the user purchase validation code is sensitive. The encryption component 210 may determine that the data sensitivity exceeds an encryption threshold, and thus the encryption component 210 may store the first data 208 of the file (A) as encrypted first data 218 of file (A). In this way, sensitive data, such as the user purchase validation code, may be encrypted for storage within the partially encrypted file system 216.

Figure 2B:
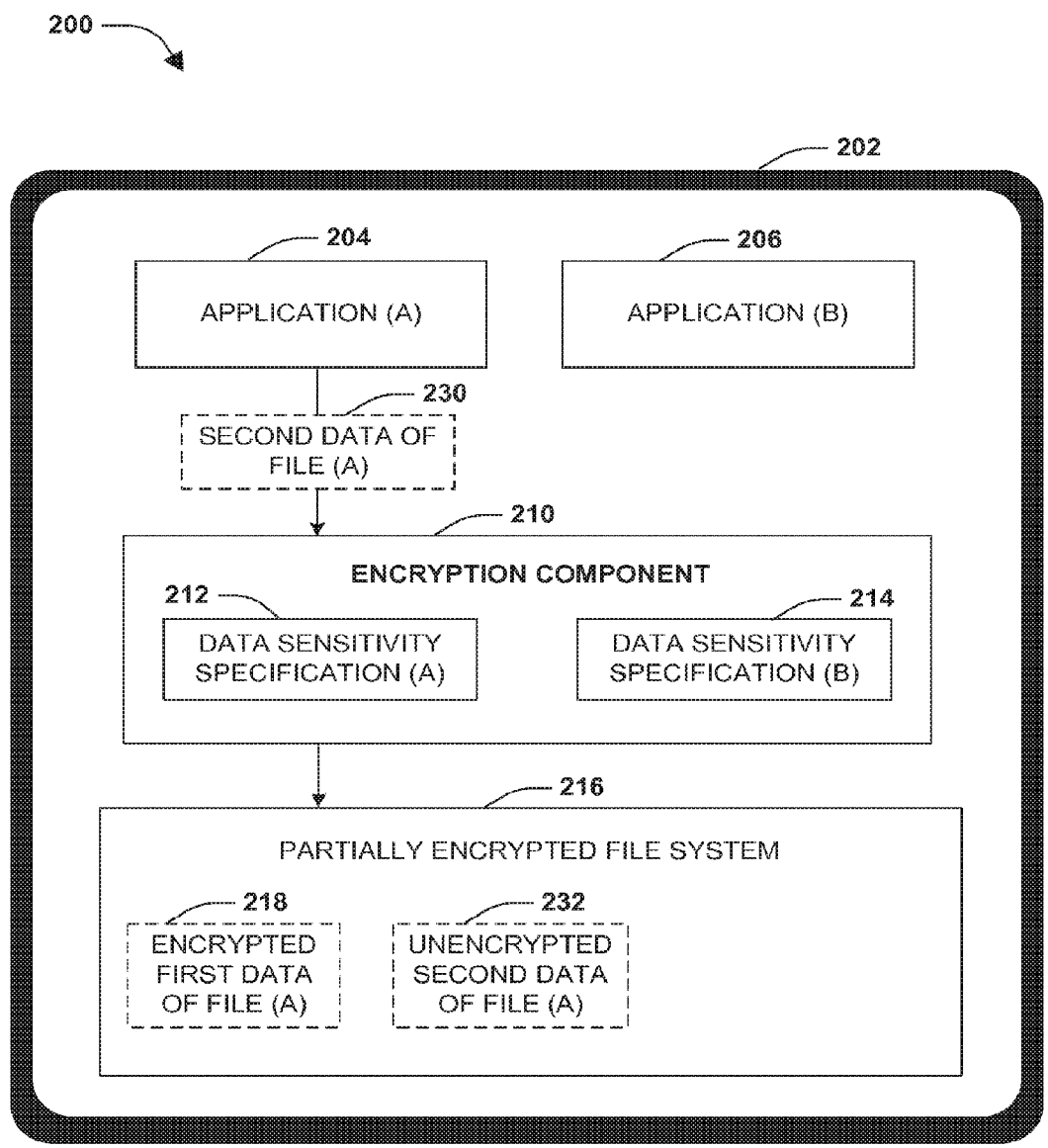
FIG. 2B is a component block diagram illustrating an exemplary system for managing a partially encrypted file system, where second data is stored as unencrypted second data within the partially encrypted file system.

FIG. 2B illustrates an example of the encryption component 210 storing data of the application (A) 204 in the partially encrypted file system 216. For example, the encryption component 210 may identify second data 230 of the file (A) that is to be stored by the application (A) 204. In an example, the second data 230 of file (A) may correspond to a racing game car model stored within the racing game file of the racing videogame. The encryption component 210 may evaluate the data sensitivity specification (A) 212 to determine a second data sensitivity for the racing game car model. For example, the second data sensitivity may indicate that the racing game car model is not sensitive. The encryption component 210 may determine that the second data sensitivity does not exceed the encryption threshold, and thus the encryption component 210 may store the second data 230 of the file (A) as unencrypted second data 232 of file (A). In this way, non-sensitive data, such as the racing game car model, may be stored within the partially encrypted file system 216 without encryption which may conserve energy usage, otherwise consumed during encryption such as by a general CPU of the computing device 202, thus improving battery life of the computing device 202.

Figure 2C:
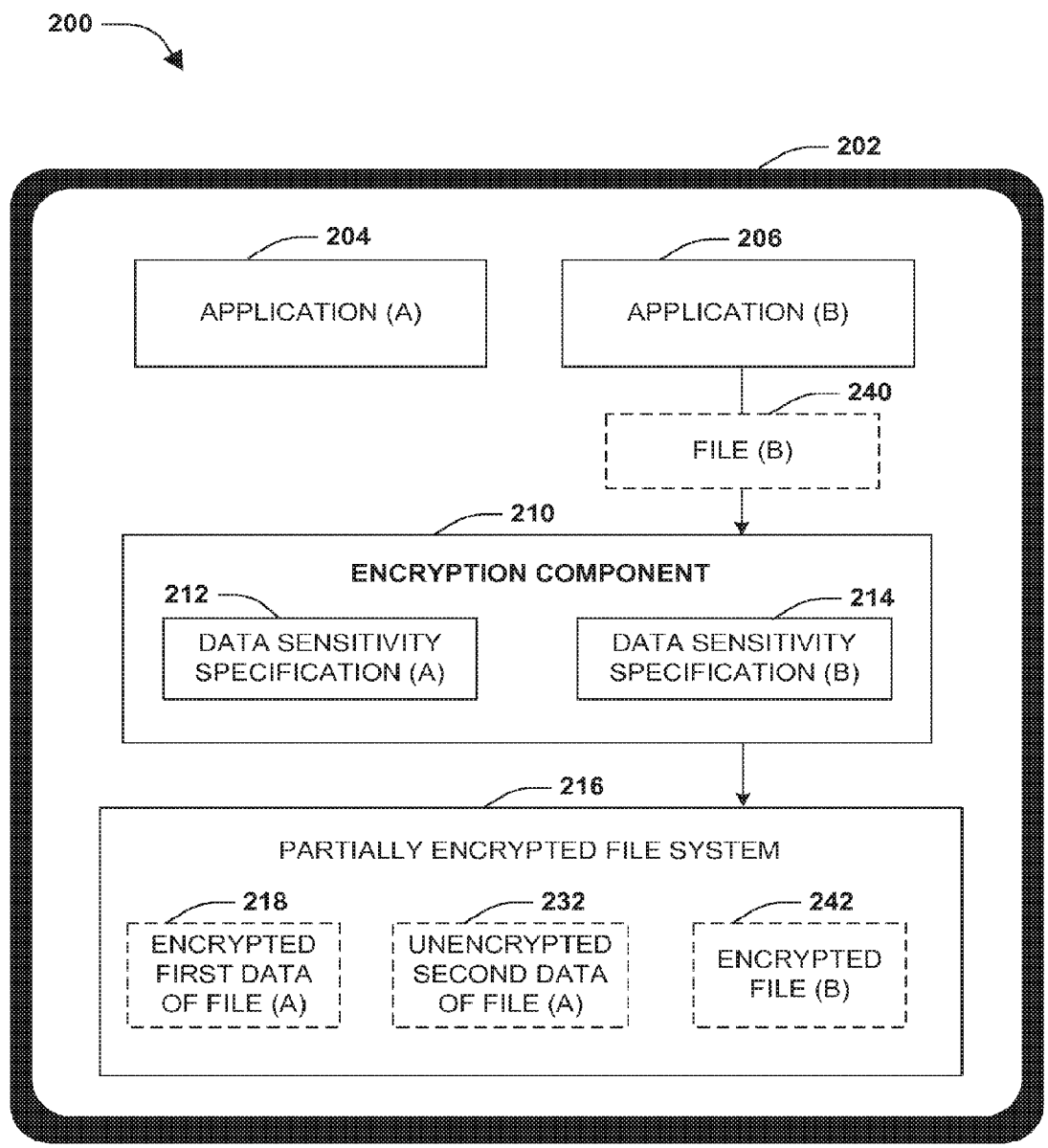
FIG. 2C is a component block diagram illustrating an exemplary system for managing a partially encrypted file system, where a file is stored as an encrypted file within the partially encrypted file system.

FIG. 2C illustrates an example of the encryption component 210 storing data of the application (B) 206 in the partially encrypted file system 216. For example, the encryption component 210 may identify a file (B) 240 that is to be stored by the application (B) 206. In an example where the application (B) 206 comprises a banking application, the file (B) 240 may correspond to a bank file of a banking application. The encryption component 210 may evaluate a data sensitivity specification (B) 214 associated with the application (B) 206 to determine a data sensitivity for the bank file. For example, the data sensitivity may indicate that the bank application and files associated with the bank application are sensitive. The encryption component 210 may determine that the data sensitivity exceeds the encryption threshold, and thus the encryption component 210 may store the file (B) 240 as encrypted file (B) 242 within the partially encrypted file system 216. In this way, sensitive data, such as the bank file, may be encrypted for storage within the partially encrypted file system 216.

Figure 2D:
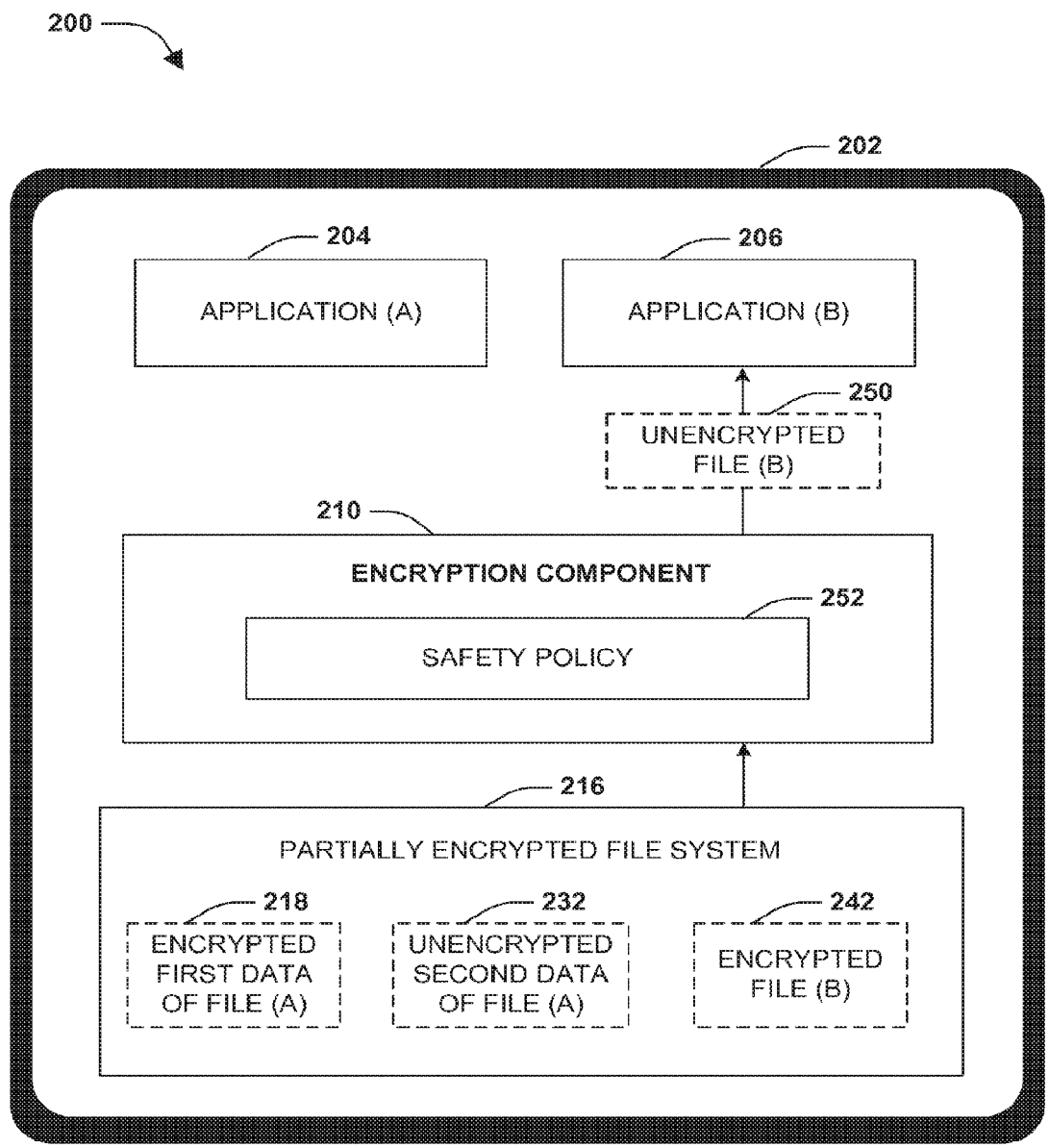
FIG. 2D is a component block diagram illustrating an exemplary system for managing a partially encrypted file system, where a safety policy is implemented.

FIG. 2D illustrates an example of the encryption component 210 enforcing a safety policy 252 in order to maintain security and privacy of data retrieved from the partially encrypted file system 216. For example, the application (B) 206 may request the encrypted file (B) 242. The encryption component 210 may unencrypt the encrypted file (B) 242 to create an unencrypted file (B) 250 that may be provided to the application (B) 206. Usage of the unencrypted file (B) 250 and/or a location of the unencrypted file (B) 250 may be actively tracked based upon the safety policy 252. The safety policy 252 may specify that no unencrypted copies of encrypted files are to remain on persistent storage after use by a requestor so that unencrypted data is not left behind on persistent storage. In this way, the encryption component 210 may delete or encrypt the unencrypted file (B) 250 after usage by the application (B) 206.

Figure 3:
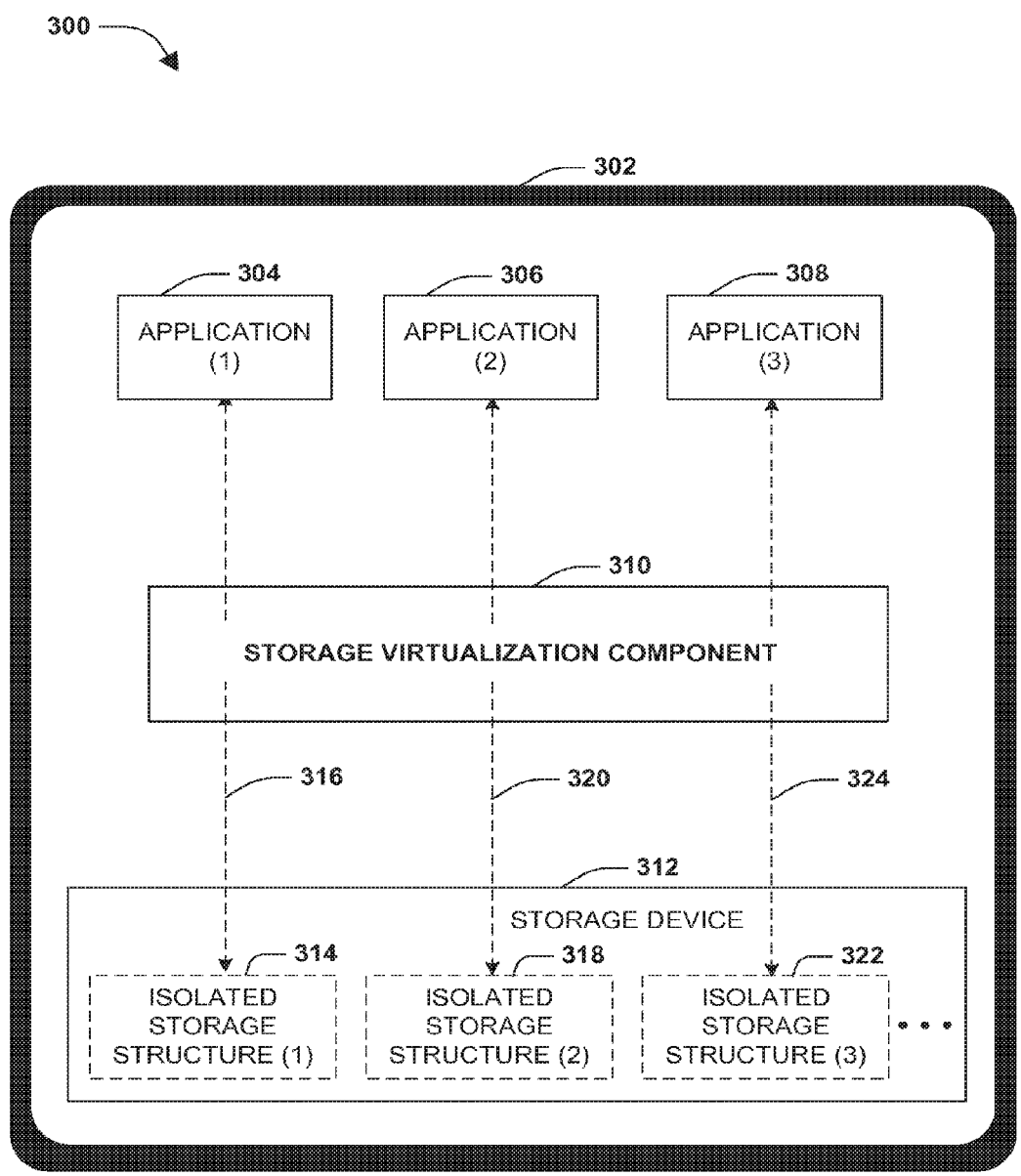
FIG. 3 is a component block diagram illustrating an exemplary system for storage hardware virtualization.

FIG. 3 illustrates an example of a system 300 for storage hardware virtualization. The system 300 comprise a storage virtualization component 310 associated with a computing device 302, such as a mobile device. In an example, the storage virtualization component 310 may be implemented as a hardware component within storage hardware circuitry (e.g., a system on a chip (SoC), an application specific integrated circuit (ASIC), or other encryption circuitry and/or isolation circuitry associated with a storage layer that is between a storage device 312 and a file system of the computing device 302. The storage virtualization component 310 may identify the storage device 312 associated with the computing device 302. In an example, the storage device 312 may comprise a removable storage device, such as a non-volatile memory card, an integrated storage device (e.g., flash storage that is soldered to a board of the computing device 302, which may be pulled or broken away from the computing device 302 without losing data), or other storage coupled to the computing device 302.

The storage virtualization component 310 may be configured to expose the storage device 312 to an operating system and/or applications of the computing device 302 as a plurality of independent and isolated virtualized storage devices (e.g., make a single storage device appear as a plurality of storage devices). For example, the storage virtualization component 310 may identify a first application 304 that is to be hosted by the computing device 302. The storage virtualization component 310 may expose a first portion of the storage device 312 as a first isolated storage structure 314 for data storage by the first application 304, such as based upon a first energy constraint, for example, for the first application (e.g., the first application may be allocated a particular amount of computing resources for execution, such as power consumption corresponding to utilization of the storage device 312). The storage virtualization component 310 may identify a second application 306 that is to be hosted by the computing device 302. The storage virtualization component 310 may expose a second portion of the storage device 312 as a second isolated storage structure 318 for data storage by the second application 306, such as based upon a second energy constraint, for example, for the second application (e.g., the second application may be allocated a particular amount of computing resources for execution, such as power consumption corresponding to utilization of the storage device 312). The storage virtualization component 310 may identify a third application 308 that is to be hosted by the computing device 302. The storage virtualization component 310 may expose a third portion of the storage device 312 as a third isolated storage structure 322 for data storage by the third application 308, such as based upon a third energy constraint, for example, for the third application (e.g., the third application may be allocated a particular amount of computing resources for execution, such as power consumption corresponding to utilization of the storage device 312).

In an example, the storage virtualization component 310 may expose the first portion of the storage device 312 as a first virtualized bus 316, used to access the first isolated storage structure 314, to a file system of the computing device 302. The storage virtualization component 310 may expose the second portion of the storage device 312 as a second virtualized bus 320, used to access the second isolated storage structure 318, to the file system of the computing device 302. The storage virtualization component 310 may expose the third portion of the storage device 312 as a third virtualized bus 324, used to access the third isolated storage structure 322, to the file system of the computing device 302.

The storage virtualization component 310 may provide the first application 304 with access to the first isolated storage structure 314, but not the second isolated storage structure 318 and/or the third isolated storage structure 322. The storage virtualization component 310 may provide the second application 306 with access to the second isolated storage structure 318, but not the first isolated storage structure 314 and/or the third isolated storage structure 322. The storage virtualization component 310 may provide the third application 308 with access to the third isolated storage structure 322, but not first isolated storage structure 314 and/or the second isolated storage structure 318. In this way, the storage virtualization component 310 provides hardware level isolation between data of applications using the single storage device 312. In an example, the storage virtualization component 310 may provide an application, hosted on the computing device 302, with access to an isolated storage structure while the computing device 302 is in a low power state (e.g., a connected standby state or a display off state).

In an example, an application, hosted on the computing device 302, may comprise a managed application (e.g., a C# application, a Visual Basic .NET application, etc.) that is managed by a managed programing language environment (e.g., a common language runtime (CLR) environment). The managed programing language environment may provide isolation for the application so that other applications cannot access data of the application (e.g., to prevent another application from accessing financial data of a bank application). However, the managed programing language environment may consume a relatively large amount of energy trying to provide the isolation due to software overhead of the managed programing language environment. Because the storage virtualization component 310 provides hardware isolation between applications using the isolated storage structures, storage operations of the application may bypass the managed programing language environment (e.g., bypass energy intensive software isolation functionality provided by the CLR environment) such that the storage virtualization component 310 provides an application with energy efficient access to merely a corresponding isolated storage structure. For example, the storage virtualization component 310 may facilitate native application programming interface (API) storage operations from the application to the isolated storage structure (e.g., a C# application may directly utilize native C# storage operations to access the isolated storage structure without undue oversight by the CLR environment).

Figure 4:
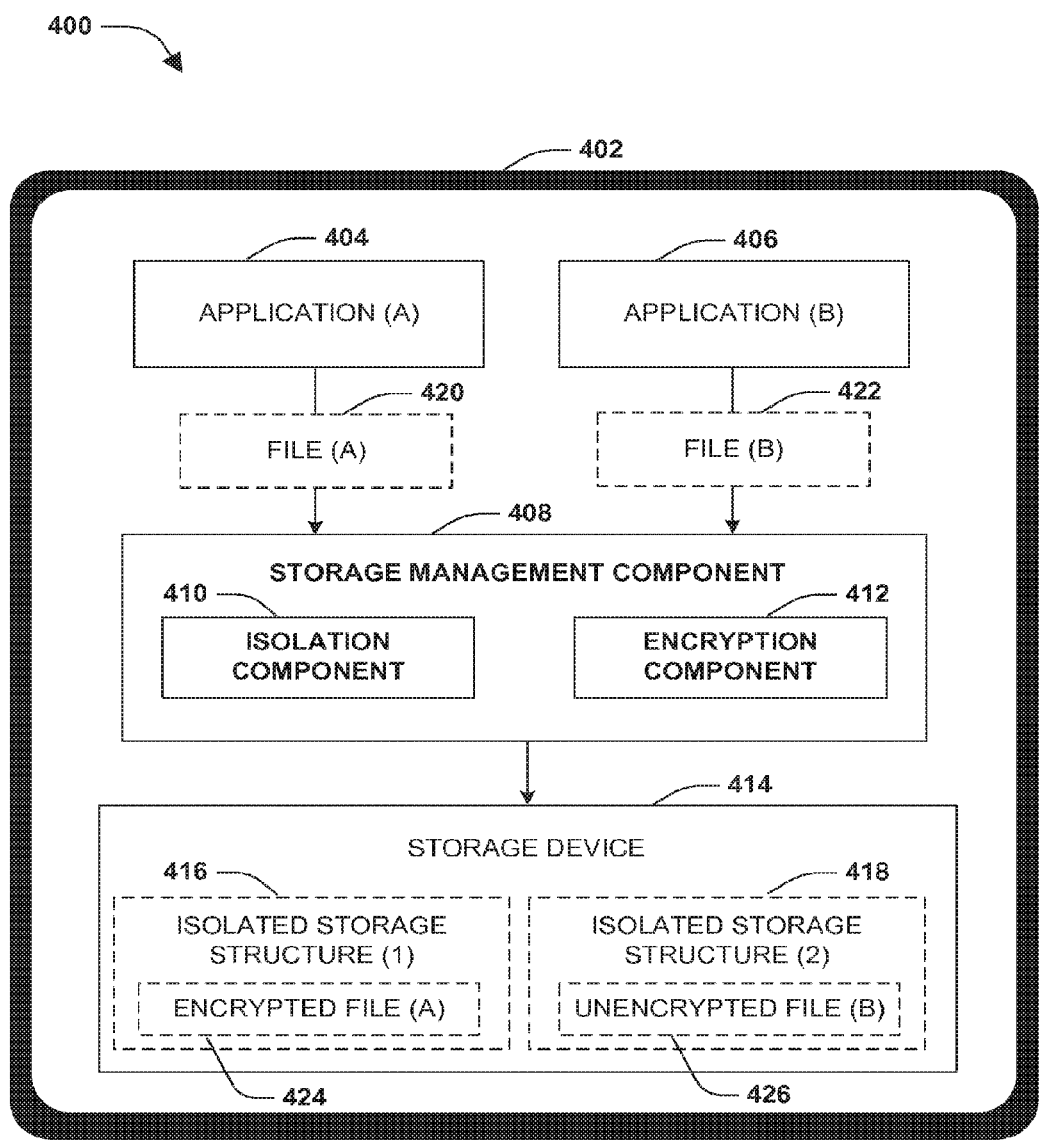
FIG. 4 is a component block diagram illustrating an exemplary system for storage management.

FIG. 4 illustrates an example of a system 400 for storage management of a computing device 402. The system 400 comprises a storage management component 408. The storage management component 408 may comprise an isolation component 410 and/or an encryption component 412. In an example, the storage management component 408 may be implemented as an application specific integrated circuit (ASIC) or a system on a chip (SoC), which may improve performance, reduce energy consumption, and/or improve battery life of the computing device 402 in comparison with encryption software and/or isolation software executed by a general CPU of the computing device 402.

The isolation component 410 may be configured to provide an application (A) 404, hosted on the computing device 402, with access to a first portion of a storage device 414 but not a second portion of the storage device 414. The isolation component 410 may be configured to provide an application (B) 406, hosted on the computing device 402, with access to the second portion of the storage device 414 but not the first portion of the storage device 414. For example, the isolation component 410 may expose a first isolated storage structure 416 to the application (A) 404 for data storage, and may isolate the application (A) 404 from accessing a second isolated storage structure 418. The isolation component 410 may expose the second isolated storage structure 418 to the application (B) 406 for data storage, and may isolate the application (B) 406 from accessing the first isolated storage structure 416. In this way, the isolation component 410 may provide hardware isolation between applications using a single storage device 414.

The encryption component 412 may be configured to store first data of the application (A) 404 as encrypted data within the first portion of the storage device 414 (e.g., based upon the first data and/or the first application being determined as corresponding to sensitive data). The encryption component 412 may be configured to store second data of the application (B) 406 as encrypted data within the second portion of the storage device 414 (e.g., based upon the second data and/or the second application being determined as corresponding to non-sensitive data). For example, the encryption component 412 may identify a file (A) 420 that is to be stored by the application (A) 404 to the first isolated storage structure 416. Responsive to a data sensitivity of the file (A) 420 exceeding an encryption threshold, the encryption component 412 may store the file (A) 420 as encrypted file (A) 424 within the first isolated storage structure 416. In this way, data isolation is provided by the first isolated storage structure 416 and security is provided by encryption. The encryption component 412 may identify a file (B) 422 that is to be stored by the application (B) 406 to the second isolated storage structure 418. Responsive to a data sensitivity of the file (B) 422 not exceeding the encryption threshold, the encryption component 412 may store the file (B) 422 as unencrypted file (B) 426 within the second isolated storage structure 416. In this way, data isolation is provided by the second isolated storage structure 418 and energy is conserved by not encrypting data that is not sensitive.

The storage management component 408 may be configured to identify a data throughput rate of the storage device 414. The storage management component 408 may provide access to the first isolated storage structure 416 such as to the encrypted file (A) 424 and/or to the second isolated storage structure 418 such as to the unencrypted file (B) 426 based upon the data throughput rate. In an example, the storage management component 408 may provide data access at a rate that may be relatively similar to the data throughput rate while providing encryption and/or isolation because the storage management component 408 may be implemented as the application specific integrated circuit (ASIC) or the system on a chip (SoC) (e.g., as compared to less efficient implementations, such as a general purpose CPU).

According to an aspect of the instant disclosure, a method for managing a partially encrypted file system is provided. The method includes identifying data that is to be stored by an application to a partially encrypted file system. The method includes determining a data sensitivity for the data. The method includes responsive to the data sensitivity exceeding an encryption threshold, storing the data as encrypted data within the partially encrypted file system. The method includes responsive to the data sensitivity not exceeding the encryption threshold, storing the data as unencrypted data within the partially encrypted file system.

According to an aspect of the instant disclosure, a system for storage hardware virtualization is provided. The system includes a storage virtualization component. The storage virtualization component is configured to identify a first application that is to be hosted by a computing device. The storage virtualization component is configured to identify a second application that is to be hosted by the computing device. The storage virtualization component is configured to expose a first portion of a storage device to the first application as a first isolated storage structure for data storage by the first application based upon a first energy constraint for the first application. The storage virtualization component is configured to expose a second portion of the storage device to the second application as a second isolated storage structure for data storage by the second application based upon a second energy constraint for the second application.

According to an aspect of the instant disclosure, a system for storage management is provided. The system includes a storage management component comprising an isolation component. The isolation component is configured to provide a first application hosted on a computing device with access to a first portion of a storage device but not a second portion of the storage device. The isolation component is configured to provide a second application hosted on the computing device with access to the second portion of the storage device but not the first portion of the storage device.

According to an aspect of the instant disclosure, a means for managing a partially encrypted file system is provided. Data that is to be stored by an application to a partially encrypted file system is identified, by the means for means for managing a partially encrypted file system. A data sensitivity for the data may be determined, by the means for means for managing a partially encrypted file system. Responsive to the data sensitivity exceeding an encryption threshold, the data is stored as encrypted data within the partially encrypted file system, by the means for means for managing a partially encrypted file system. Responsive to the data sensitivity not exceeding the encryption threshold, the data is stored as unencrypted data within the partially encrypted file system, by the means for means for managing a partially encrypted file system.

According to an aspect of the instant disclosure, a means for storage hardware virtualization is provided. A first application that is to be hosted by a computing device is identified, by the means for storage hardware virtualization. A second application that is to be hosted by the computing device is identified, by the means for storage hardware virtualization. A first portion of a storage device is exposed to the first application as a first isolated storage structure for data storage by the first application, by the means for storage hardware virtualization based upon a first energy constraint for the first application. A second portion of the storage device is exposed to the second application as a second isolated storage structure for data storage by the second application, by the means for storage hardware virtualization based upon a second energy constraint for the second application.

According to an aspect of the instant disclosure, a means for storage management is provided. A first application hosted on a computing device is provided with access to a first portion of a storage device but not a second portion of the storage device, by the means for storage management. A second application hosted on the computing device is provided with access to the second portion of a storage device but not the first portion of the storage device, by the means for storage management.

Figure 5:
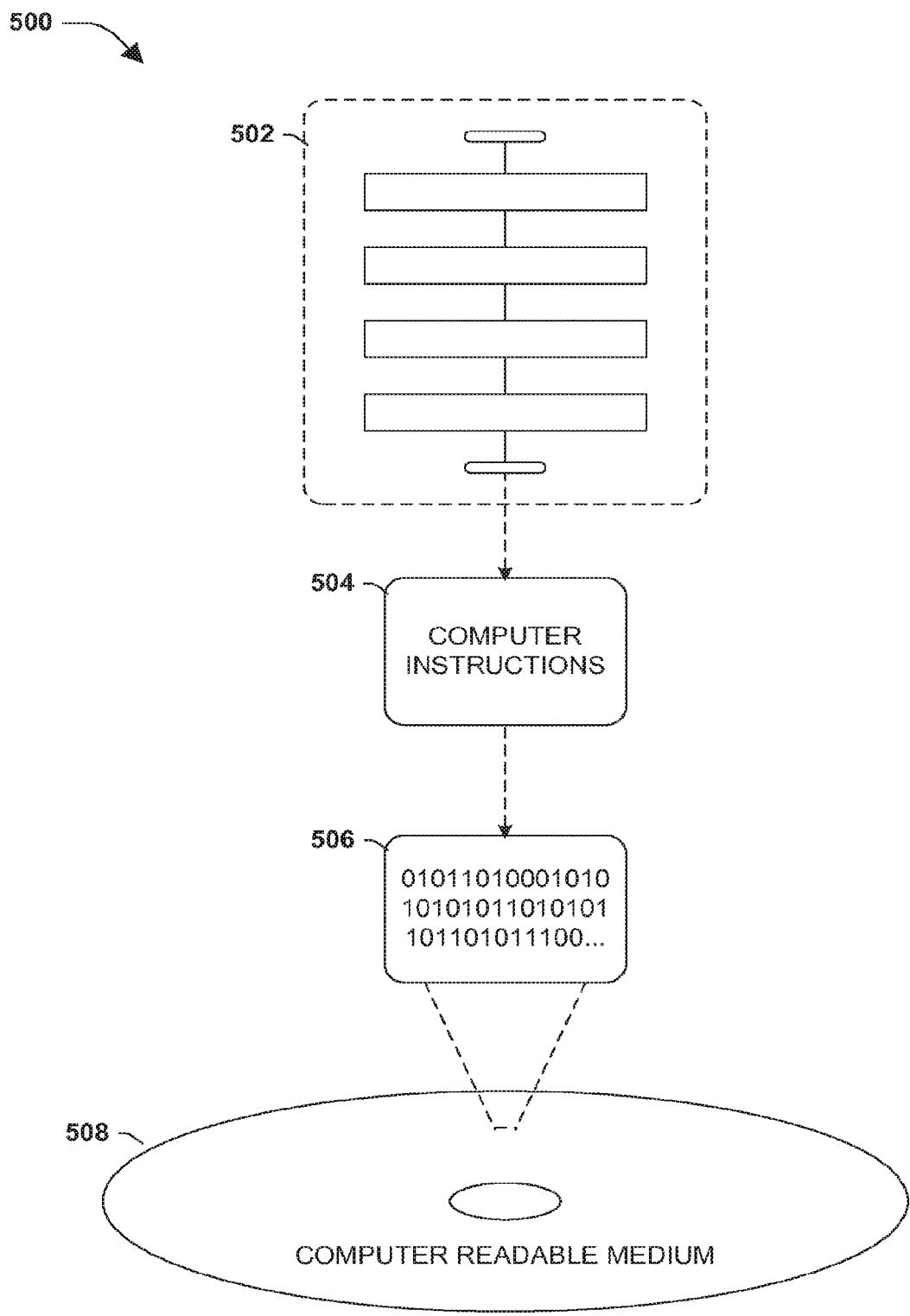
FIG. 5 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 100 of FIG. 1, for example. In some embodiments, the processor-executable instructions 504 are configured to implement a system, such as at least some of the exemplary system 200 of FIGS. 2A-2D, at least some of the exemplary system 300 of FIG. 3, and/or at least some of the exemplary system 400 of FIG. 4, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
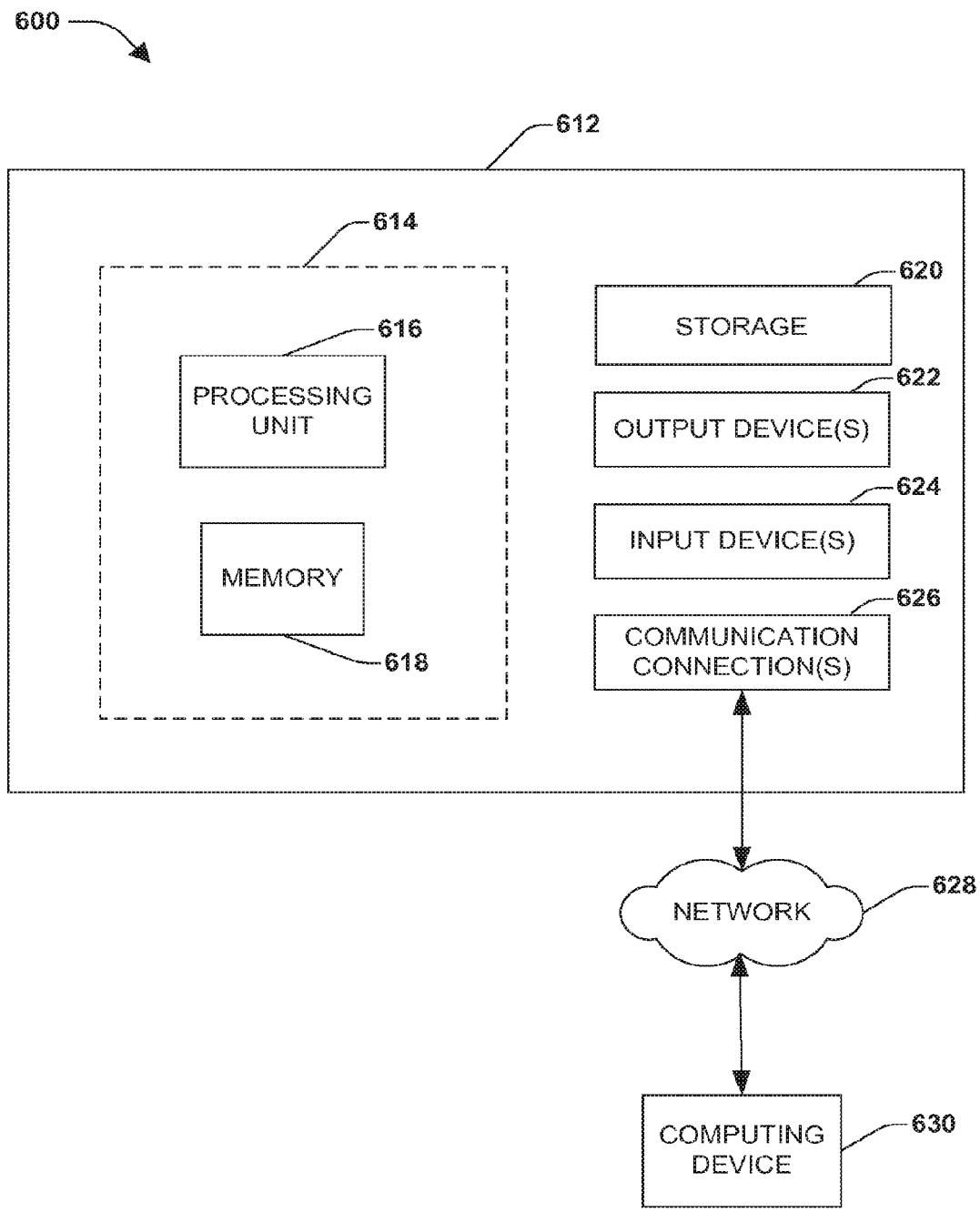
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Computer storage media does not, however, include propagated signals. Rather, computer storage media excludes propagated signals. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for storage hardware virtualization, comprising:
   a hardware processor to:
   identify a first application that is to be hosted by a computing device;
   identify a second application that is to be hosted by the computing device;
   expose a first portion of a storage device to the first application as a first isolated storage structure for data storage by the first application based upon a first energy constraint for the first application, wherein the first energy constraint comprises storing non-sensitive data as unencrypted data in response to detecting the system is in a standby state in which the system does not provide power to a display device; and
   expose a second portion of the storage device to the second application as a second isolated storage structure for data storage by the second application based upon a second energy constraint for the second application, wherein the second energy constraint corresponds to the system in a full power state and comprises storing an unencrypted copy of encrypted data in a non-persistent memory, the unencrypted copy of the encrypted data to be deleted in response to detecting the second application has executed instructions based on the unencrypted copy of the encrypted data.

2. The system of claim 1, wherein the hardware processor is to:
   provide the first application with storage access to the first isolated storage structure but not the second isolated storage structure; and
   provide the second application with storage access to the second isolated storage structure but not the first isolated storage structure.

3. The system of claim 1, wherein the hardware processor is to provide hardware level isolation between the first isolated storage structure and the second isolated storage structure.

4. The system of claim 1, wherein the hardware processor is to:
   expose the first portion of the storage device as a first virtualized bus to a file system of the computing device; and
   expose the second portion of the storage device as a second virtualized bus to the file system of the computing device.

5. The system of claim 1, wherein the hardware processor is to: facilitate a native application programming interface (API) storage operation from the first application to the first isolated storage structure.

6. The system of claim 5, wherein the hardware processor is to: facilitate the native API storage operation as a bypass to at least one of a managed programming language environment or a common language runtime environment.

7. The system of claim 1, wherein the hardware processor is to track the unencrypted copy of the encrypted data in the non-persistent memory.

8. The system of claim 1, the computing device comprising a mobile device, and the storage device comprising at least one of an integrated storage device or a removable storage device coupled to the mobile device.

9. The system of claim 1, wherein the hardware processor is to facilitate access to at least one of the first isolated storage structure or the second isolated storage structure while the computing device is in a low power state.

10. A system for storage management comprising:
a hardware processor to:
provide a first application hosted on a computing device with access to a first portion of a storage device but not a second portion of the storage device based upon a first energy constraint for the first application, wherein the first energy constraint comprises storing non-sensitive data as unencrypted data in response to detecting the computing device is in a standby state in which the computing device does not provide power to a display device; and
provide a second application hosted on the computing device with access to the second portion of the storage device but not the first portion of the storage device based upon a second energy constraint for the second application, wherein the second energy constraint corresponds to the computing device in a full power state and comprises storing an unencrypted copy of encrypted data in a non-persistent memory, the unencrypted copy of the encrypted data to be deleted in response to detecting the second application has executed instructions based on the unencrypted copy of the encrypted data.

11. The system of claim 10, wherein the hardware processor is to:
store first data of the first application as encrypted data within the first portion of the storage device; and
store second data of the second application as unencrypted data within the second portion of the storage device.

12. The system of claim 10, wherein the hardware processor is implemented as at least one of an application specific integrated circuit (ASIC) or a system on a chip (SoC).

13. The system of claim 10, wherein the hardware processor is to:
identify a data throughput rate of the storage device; and
provide access to at least one of the first portion or the second portion of the storage device based upon the data throughput rate.

14. A method for storage hardware virtualization, comprising:
identifying a first application that is to be hosted by a computing device;
identifying a second application that is to be hosted by the computing device;
exposing a first portion of a storage device to the first application as a first isolated storage structure for data storage by the first application based upon a first energy constraint for the first application, wherein the first energy constraint comprises storing non-sensitive data as unencrypted data in response to detecting the computing device is in a standby state in which the computing device does not provide power to a display device; and
exposing a second portion of the storage device to the second application as a second isolated storage structure for data storage by the second application based upon a second energy constraint for the second application, wherein the second energy constraint corresponds to the computing device in a full power state and comprises storing an unencrypted copy of encrypted data in a non-persistent memory, the unencrypted copy of the encrypted data to be deleted in response to detecting the second application has executed instructions based on the unencrypted copy of the encrypted data.

15. The method of claim 14, comprising:
providing the first application with storage access to the first isolated storage structure but not the second isolated storage structure; and
providing the second application with storage access to the second isolated storage structure but not the first isolated storage structure.

16. The method of claim 14 comprising providing hardware level isolation between the first isolated storage structure and the second isolated storage structure.

17. The method of claim 14, comprising:
exposing the first portion of the storage device as a first virtualized bus to a file system of the computing device; and
exposing the second portion of the storage device as a second virtualized bus to the file system of the computing device.

18. The method of claim 14, comprising facilitating a native application programming interface (API) storage operation from the first application to the first isolated storage structure.

19. The method of claim 18, comprising facilitating the native API storage operation as a bypass to at least one of a managed programming language environment or a common language runtime environment.

20. The method of claim 14, comprising facilitating access to at least one of the first isolated storage structure or the second isolated storage structure while the computing device is in a low power state.

* * * * *